United States Patent Office 2,791,558
Patented May 7, 1957

2,791,558
SULFONATE COMPOSITION OF HIGH BARIUM CONTENT

Fred W. Schuessler, Valparaiso, and Norman E. Lemmon, Hammond, Ind., assignors to Standard Oil Company, Chicago, Ill., a corporation of Indiana No Drawing. Application October 21, 1954, Serial No. 463,798

2 Claims. (Cl. 252—33)

This invention relates to a sulfonate composition of high barium content and it pertains more particularly to an improved product of this type and an improved method of making the product.

It is known that barium sulfonate complexes of high barium content are desirable additives for premium heavy duty lubricating oils and it has heretofore been proposed to produce such additives by reacting a large molar excess of a barium compound with barium sulfonate and an added phenol to obtain a product containing uncombined phenol. The prior methods required a filtration step and an inevitable loss of a portion of the reactants. An object of this invention is to provide an improved method of preparing a sulfonate composition of high barium content which requires no molar excess of barium in the reaction mixture, which requires no filtration step and which results in the production of an improved product which is substantially free from uncombined phenol. Other objects will be apparent as the detailed description of the invention proceeds.

In accordance with our invention a barium sulfonate, preferably a basic barium sulfonate obtained by neutralizing a diluted alcoholic sulfonic acid extract with barium hydroxide in the presence of water and air blowing the mixture to obtain a substantially dry basic salt, is diluted with oil and treated with additional barium hydroxide and a low boiling phenol in the presence of a critical amount of water by blowing with $CO_2$ while gradually increasing the temperature from about 200 to 400° F. followed by steaming to remove uncombined phenol. For each mol of basic barium sulfonate about 1 mol of additional barium hydroxide and about 2 to 3 mols of a low boiling phenol are employed along with about ½ to 6, preferably about 4–5, mols of water so that the total reaction mixture will contain, suspended in a hydrocarbon diluent, reactants in the approximate proportions of about: 1 mol sulfonic acid, 2 mols barium hydroxide, 2 to 3 mols phenol and ½ to 8, preferably about 4 to 5, mols of water. When employing $Ba(OH)_2.8H_2O$ as the neutralizing agent, we prefer to add an excess thereof in making the basic barium sulfonate and then to add the remainder to the dry soap mixture in order to obtain in the latter about 2 to 6 mols of added water per mol of barium in the mixture. If amounts of phenol are increased in the defined range, the amount of water should be correspondingly increased in its defined range.

The barium sulfonate-barium hydroxide-phenol-water reaction mixture should be in a sufficient amount of diluent, which is preferably a hydrocarbon oil, so that when heated to a temperature of about 200° F. with stirring, it will be fluent and intimately admixed. $CO_2$ is added to this mixture at 200° F. or slightly lower temperature and is introduced while the mixture is gradually increased in temperature to approximately 400° F. in a period of 1 to 3 hours. Its introduction should be started before any substantial amount of water is lost from the system. The rate of $CO_2$ addition should be sufficient to provide a slight excess as evidenced by some $CO_2$ in off gases.

If the reaction mixture is heated too rapidly and/or if it is heated to the high temperature before initiating the $CO_2$ introduction, the desired bright product of high barium content is not obtained. Finally, the product should be steamed at a temperature in the range of about 350° to 400° F. for removing remaining uncombined phenol.

Upon cooling to room temperature, the resulting product is bright and fluid, it requires no filtration, it is readily soluble in lubricating oil and because of its high barium content, it has outstanding utility as a lubricating oil additive for improving detergency and other desirable properties when added to lubricating oils in amounts of about .5 to 5 percent. Its ratio of mols of barium to mols of sulfonic acid is about four times that of normal barium sulfonate, yet it is substantially free from uncombined phenol.

As a specific example of the invention, a Mid-Continent distillate having a viscosity of 230 SSU at 100° F. and a flash point of 395° F. was treated with 3 pounds of fuming sulfuric acid. After sludge withdrawal, the sour oil was gas blown to remove sulfur dioxide. The oil was then extracted with aqueous alcohol of 58 percent concentration to obtain an extract containing about:

24½% sulfonic acid, molecular weight about 430
11% oil
64% aqueous alcohol
½% sulfuric acid To 500 grams of this extract containing about 0.3 mol sulfonic acid, 125 grams of $Ba(OH)_2.8H_2O$ (.43 mol Ba) were added as aqueous slurry. For diluent purposes 51 grams of pale oil was added, said oil having a viscosity of 80 SSU at 100° F. The mixture was heated to 350° F. while air blowing in order to remove water and alcohol. Since some of the diluent oil was likewise removed, an additional 162 grams of pale oil was added after the heating and air blowing. The resulting material at this stage contained about:

39.0% basic barium sulfonate
56.2% oil
1.7% barium sulfonate
3.1% barium hydroxide said material having a titratable alkalinity of about 3.5 percent as NaOH.

To 400 grams of this crude soap mixture containing 0.27 mol basic Ba sulfonate, about 48.8 grams of $Ba(OH)_2.8H_2O$ (about .17 mol Ba) and 67.2 grams of C. P. phenol (about .71 mol) were added and the mixture was again heated. This mixture contained about 0.073 mol of dry barium hydroxide which is incorporated in the final mixture with the .17 mol of $Ba(OH)_2.8H_2O$. $CO_2$ was introduced into the mixture when it reached about 200° F. and before any substantial amount of water was eliminated and was continuously introduced until the temperature reached about 400° F. The rate of $CO_2$ addition was sufficient to have an excess present at all times as evidenced by $CO_2$ in off gas and the time of gradual heating with $CO_2$ addition was about 2 hours. The product was then allowed to cool to about 350° F. and steamed at this temperature with superheated steam for about an hour to effect completion of the reaction and removal of remaining uncombined phenol. Upon cooling to room temperature the product was bright and fluid, it required no filtration, and it was substantially free from phenol. In this example the product contained about .02 percent of phenol but the phenol, of course, could be more completely removed by further steaming at 350° F.

The amount of added water in the foregoing example was about 2 to 3 mols per mol of total barium in the system or about 5.5 mols per mol of dry unreacted barium hydroxide therein.

In the foregoing example C. P. phenol was added to the reaction mixture but it should be understood that technical grades of phenol may be employed and that other phenols may be used provided that they are of sufficiently low boiling point. Phenols, e. g. substituted or alkylated phenols boiling as high as 400° F. or more, may require slightly higher treating and steaming temperatures. The normal barium sulfonate may be employed instead of basic barium sulfonate by providing a total reaction mixture having proportions hereinabove set forth. While finely divided solid $Ba(OH)_2.8H_2O$ is a preferred form of barium hydroxide since it enables control of added water, it should be understood that other barium compounds may be employed and the amount of added water controlled by accurate measurement. The water referred to herein means added water and does not include water of neutralization between the barium hydroxide and phenol.

The barium content of our sulfonate composition may be varied to some extent by increasing or decreasing the amount of sulfonic acid relative to the other components of the reaction mixture while maintaining the proportions (relative to each other) of barium, phenol and water substantially the same. If the amount of sulfonic acid is greatly decreased, there is a tendency for the product of higher barium content to be more or less turbid. On the other hand, if the amount of sulfonic acid is greatly increased, the barium content may approach that of basic barium sulfonate. The amount of sulfonic acid should be sufficiently small to give a product having a higher barium content than that of basic barium sulfonate but it should be sufficiently large to avoid turbidity in the finished product. It should, therefore, be understood that the amounts of sulfonic acid or barium sulfonate recited in the annexed claims are approximate.

We claim:

1. The method of making a sulfonate composition of high barium content, which method comprises adding an excess of aqueous barium hydroxide to a sour alcoholic sulfonic acid-containing extract to neutralize the extract and form a basic barium sulfonate, heating the resultant mixture to a temperature in the range of 300 to 400° F. and blowing the heated mixture with air to remove water and alcohol therefrom and producing dry basic barium sulfonate soap containing excess barium hydroxide, diluting the dry soap with diluent oil and adding thereto about 2 to 3 mols of a phenol per mol of basic barium sulfonate and an amount of additional barium hydroxide which when combined with the excess barium hydroxide provides about 1 mol of barium hydroxide per mol of basic barium sulfonate soap, adding to the mixture about 2 to 6 mols of water per mol of barium hydroxide in the total mixture, initially heating the mixture to a temperature in the range of about 160 to 200° F. and starting the introduction of $CO_2$ into said mixture before there is any substantial loss of water therefrom, then gradually heating the mixture to about 400° F. while adding $CO_2$ thereto for a period of about 1 to 3 hours, and then steaming the mixture at a temperature in the range of about 350 to 400° F. to remove substantially all of the remaining uncombined phenol and cooling the product after the steaming step to obtain a bright fluid sulfonate composition of high barium content dissolved in diluent oil.

2. The method of making a sulfonate composition of high barium content, which method comprises preparing a reaction mixture of barium sulfonate, barium hydroxide, a phenol boiling below 400° F., and water in a diluent oil with the reactants in the approximate proportions of 1 mol barium sulfonate:1 mol barium hydroxide:2 to 3 mols phenol:2 to 6 mols water, at least a part of said water being introduced as water of hydrogen with said barium hydroxide, heating the reaction mixture to a temperature of about 160 to 200° F., then, before any substantial amount of water is lost from the system, introducing an excess of carbon dioxide thereto and gradually increasing the temperature of the mixture to about 400° F. in a period of about 1 to 3 hours while continuing the introduction of carbon dioxide and thereafter steaming the mixture at a temperature of about 350 to 400° F. to remove uncombined phenol therefrom and to obtain a bright fluid sulfonate composition of high barium content dissolved in diluent oil which contains no insoluble component requiring filtration.

References Cited in the file of this patent
UNITED STATES PATENTS

| | | |
|---|---|---|
| 2,616,911 | Asseff et al. | Nov. 4, 1952 |
| 2,698,296 | Musselman | Dec. 28, 1954 |

UNITED STATES PATENT OFFICE

CERTIFICATE OF CORRECTION

Patent No. 2,791,558

May 7, 1957

Fred W. Schuessler et al.

It is hereby certified that error appears in the printed specification of the above numbered patent requiring correction and that the said Letters Patent should read as corrected below.

Column 4, line 27, for "hydrogen" read -- hydration --.

Signed and sealed this 6th day of August 1957.

(SEAL)
Attest:

KARL H. AXLINE

Attesting Officer

ROBERT C. WATSON
Commissioner of Patents